(12) United States Patent
Albanesi et al.

(10) Patent No.: US 6,586,063 B1
(45) Date of Patent: Jul. 1, 2003

(54) MULTIPLE LAYER CONTAINER

(75) Inventors: Mario Albanesi, Rome (IT); Marco Ciofani, Rome (IT)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 08/930,981

(22) PCT Filed: Mar. 20, 1996

(86) PCT No.: PCT/US96/03946

§ 371 (c)(1),
(2), (4) Date: Feb. 27, 1998

(87) PCT Pub. No.: WO96/33070

PCT Pub. Date: Oct. 24, 1996

(30) Foreign Application Priority Data

Apr. 15, 1995 (EP) ............................................. 95200957

(51) Int. Cl.[7] ......................... B32B 27/40; B65D 23/02; B65D 23/08; B65D 81/24

(52) U.S. Cl. ............ 428/35.7; 206/524.6; 215/DIG. 6; 220/455; 220/457; 220/DIG. 14; 424/661; 428/36.6; 428/36.7; 428/200; 428/412; 428/423.1; 428/423.7; 428/424.2; 428/424.6; 428/474.6; 428/474.4; 428/476.9; 428/480

(58) Field of Search ................................. 428/35.2, 35.4, 428/35.7, 36.6, 36.7, 200, 412, 474.4, 476.9, 480, 483, 516, 518, 423.1, 423.7, 424.2, 424.6; 206/524.2, 524.3, 524.4, 813; 215/12.1, 12.2; 220/62.22; 422/102

(56) References Cited

U.S. PATENT DOCUMENTS

| | | | | | |
|---|---|---|---|---|---|
| 4,927,689 | A | * | 5/1990 | Markiewicz | ................ 428/35.4 |
| 4,929,476 | A | * | 5/1990 | Gibbons et al. | ............ 428/34.2 |
| 5,126,070 | A | * | 6/1992 | Leifheit et al. | ......... 252/186.36 |
| 5,135,785 | A | * | 8/1992 | Millon | ........................ 428/35.2 |
| 5,183,706 | A | * | 2/1993 | Bekele | ......................... 428/349 |
| 5,449,552 | A | | 9/1995 | Bochow et al. | .............. 428/323 |
| 5,491,011 | A | | 2/1996 | Pezzoli et al. | .............. 428/36.7 |
| 5,545,375 | A | * | 8/1996 | Tropsha et al. | .............. 422/102 |

FOREIGN PATENT DOCUMENTS

| | | | | |
|---|---|---|---|---|
| JP | 57153659 | A | * | 9/1982 |
| JP | 59008970 | A | * | 1/1984 |

* cited by examiner

Primary Examiner—Sandra M. Nolan
(74) Attorney, Agent, or Firm—Thibault Fayette; Kim William Zerby; Steven W. Miller

(57) ABSTRACT

A multilayer material for containing liquid products, specifically for liquid products comprising a hypochlorite bleach is provided. This multi-layer material comprises an inner layer, a layer of adhesive and an outer layer. Said multi-layer material further comprises a bleach resistant adhesive which prevents the degradation of the multi-layer material when exposed to the aggressive action of the hypochlorite bleach or components of said bleach.

4 Claims, No Drawings

MULTIPLE LAYER CONTAINER

FIELD OF THE INVENTION

The present invention relates to multi-layer materials suitable for forming into flexible containers. Specifically, the present invention relates to multi-layer materials which resist to the aggressive action of products comprising hypochlorite bleach.

BACKGROUND OF THE INVENTION

A wide variety of packaging materials are known. Many of said packaging materials are in the form of materials made of different layers. Said various layers allow to obtain a composite material with a desired combination of properties otherwise not available from a single layer of a single material.

A commercially available and very cost efficient multi-layer material comprises polyethylene terephthalate (=PET) laminated with an adhesive to a polyethylene layer. Preferably, said polyethylene layer is made of low density polyethylene (=LDPE). Usually the PET is the outer layer and the LDPE is the inner layer when this multi-layer material is formed into a container, preferably into a flexible sachet or pouch. In a very common execution, sachets or pouches have flat, substantially parallel, opposed rectangular walls completely joined together by heat sealing around their peripheral edges. Specifically, the inner layers of the opposed walls made of LDPE are intimately sealed together. The resulting sachet or pouch is leak tight, and sufficiently resistant to punctures, therefore completely suitable for containing liquid products.

We found that such a container degrades when it contains a liquid product comprising a hypochlorite bleach. Indeed, the migration of said hypochlorite bleach, or components of said bleach, through said LDPE layer towards the outside of said container is not prevented, specifically towards the adhesive layer of said container. Consequently, said adhesive between the LDPE layer and the outer PET layer is exposed to said bleach or said bleach component(s). As a result, said adhesive may be decomposed, whereby losing its bonding properties. Therefore, the PET layer may de-laminate partially or completely from the LLDPE layer. Eventually, the containment properties of said container are degraded, if not completely lost.

It is therefore an object of the present invention to provide a multi-layer material, whose containment properties when formed into a container do not degrade, when said container contains a liquid product comprising a hypochlorite bleach.

SUMMARY OF THE INVENTION

The present invention is a multi-layer material for containing liquid products comprising hypochlorite bleach. This multi-layer material comprises an inner layer, a layer of adhesive and an outer layer. Said inner layer is made of a heat sealable polyolefin, and said outer layer is made of a printable plastic material. Said multi-layer material further comprises a means which prevents that said multi-layer material degrades with the aggressive action of said hypochlorite bleach or components of said bleach. Preferably, said multi-layer material according to the present invention comprises a barrier layer and/or a bleach resistant adhesive layer.

DETAILED DESCRIPTION OF THE INVENTION

In the following, "aggressive" describes the decomposing action exerted by at least a component of said hypochlorite bleach onto a layer of the multi-layer material according to the present invention, like the adhesive layer. Furthermore, in the following, "degradation" is the result of the aggressive action of at least a component of said hypochlorite bleach onto a layer of the multi-layer material according to the present invention, like the de-lamination of the outer layer from the inner layer. A "degradation of the package" may also mean that the package loses its leak tightness caused by the aggressive action of said hypochlorite bleach.

The multi-layer material according to the present invention comprises an outer layer, an inner layer and an adhesive layer. The outer layer should be suitable for printing. Indeed, said outer layer is the outermost layer of said multi-layer material when said multi-layer material is formed into a container. Therefore, suitable materials for the outer layer are printable plastic materials, like polypropylene (=PP), polyethylene terephthalate (=PET), polyamide, polystyrene, ethylene/vinyl alcohol copolymer (=EVOH), polycarbonate, polyvinyl chloride (=PVC) or cellophane. Preferred printable plastic material for said outer layer is PP or PET.

To facilitate the printing process and/or to ensure an adequate bonding of the inks of the printing on the plastic surface, the surface of the printable plastic is usually varnished with electrostatic coatings or Corona-treated. Both the electrostatic coating and the Corona treatment are methods which are able to orient the electrical charges on the exterior surface of the layer. The orientation of the electrical charges give rise to attractive electrostatic forces for the subsequent adhesion of the inks. Specifically, the electrostatic coating is the application of a solution containing metal ions on the exterior surface of the outer layer. Whereas, the Corona treatment is an electrostatic method also acting on the exterior surface of the outer layer.

Said inner layer is made of a heat sealable polyolefin. A heat sealable polyolefin facilitates the forming of a container. Indeed, to form a container it is sufficient to seal together said inner layer of a first sheet to said inner layer of a second sheet with a heat sealing process, both sheets being made of the multi-layer material according to the present invention. Preferably, said heat sealable polyolefin is polyethylene, more preferably polyethylene of low density (=LDPE) or linear low density polyethylene (=LLDPE). As a preferred option, ethylene/vinyl acetate copolymer (=EVA) is added to said inner layer to lower the melting point and facilitate consequently the heat sealing process. Preferably, said inner layer made of LDPE or LLDPE has a density of at least 0.9 g/cm$^3$ (gram per cubic centimeter), more preferably in the range of 0.910 g/cm$^3$ to 0.925 g/cm$^3$. The thickness of said inner layer is preferably above 80 $\mu$m, more preferably between 95 $\mu$m and 105 $\mu$m.

A third layer herein is an adhesive layer. Said adhesive layer attaches said outer layer with said inner layer. Preferably, said adhesive layer may attach said outer layer to said inner layer through a lamination process. We found that said adhesive layers in the sachets of the prior art are sensitive to the hypochlorite bleach or component(s) of said hypochlorite bleach which is able to migrate through said inner layer. Said adhesive layer, exposed to the aggressive action of said hypochlorite bleach component(s), decomposes. Consequently, the outer layer de-laminates from the inner layer. Therefore, the multi-layer material according to the present invention further comprises a means which prevents that said multi-layer material degrades with the aggressive action of said hypochlorite bleach or components of said hypochlorite bleach.

A means which prevents that said multi-layer material degrades with the aggressive action of said hypochlorite bleach or components of said bleach according to the present invention is an adhesive resistant to hypochlorite bleach. Preferably, said bleach resistant adhesive is made of polyurethane, more preferably, of a two component polyurethane. These adhesive made of polyurethane exhibit a good balance between performance and cost. The two-component polyurethane adhesive comprises as a first component a mixture of polyurethane and other minor ingredients. The second component comprises isocyanate as co-reactant. This co-reactant acts as a catalyst when mixed with the first component of the two-component polyurethane adhesive.

Said mixing of said co-reactant with said first component improves the bonding properties of said adhesive via a controlled cross-linking of the polymeric structure. Furthermore, the mixture of said co-reactant with said first component improves the flexibility of the adhesive layer, reducing the possibility of breakings in the adhesive layer itself.

Preferably, said first component is first mixed together with said second component of said two-component polyurethane adhesive before applying it onto said multi-layer material. Once applied onto said multi-layer material, such adhesives require usually at least 10 days aging for proper reticulation and polymerization of the adhesive's components before said multi-layer material is further processed and formed into a container. An example of a commercially available adhesive, which we found to be suitable, is ET-691 produced by Morton GmbH, Beim Struckenberge 11, D-28239 Bremen, Germany. We found that this adhesive is sufficiently resistant to the aggressive action of the hypochlorite bleach component(s) to be used in the multi-layer material according to the present invention.

We found that the adhesive's resistance to the aggressive action of said hypochlorite bleach or component(s) of said bleach may be further increased when the adhesive is applied above a threshold surface density. The surface density of said adhesive is the quantity of adhesive over a unit surface, hereinafter expressed in g/m$^2$ (gram of adhesive per square meter of plastic layer). Consequently, said surface density defines also the thickness of said adhesive layer. Said threshold surface density of said adhesive depends principally on the type of the adhesive itself and from the diffusivity of said hypochlorite bleach components of said product through said inner layer. As an example, using a polyurethane adhesive, an inner layer having a thickness of about 100 μm and having a product comprising hypochlorite bleach with an available chlorine concentration of up to about 150 g/l (gram per liter), we determined a threshold surface density of at least 2.5 g/m$^2$, more preferably of about 4 g/m$^2$.

This threshold surface density has been determined experimentally. In practice, several multi-layer materials with adhesive layers of different surface densities have been immersed in a product comprising the hypochlorite bleach. After 3 weeks, the multi-layer material with the adhesive layer of lowest surface density showing no delamination, determines said threshold surface density of said adhesive layer. Consequently, as a preferred option to further improve the resistance of said multi-layer material to hypochlorite bleach, said adhesive layer may be applied above said threshold surface density.

Furthermore, we found that another improvement decreasing the adhesive's sensitivity to the aggressive action of said hypochlorite bleach or component(s) of said bleach is to achieve an uniform distribution of said adhesive. Hereinafter, a uniform distribution means that the thickness of the layer is constant with an allowed deviation of less than 50%, more preferably of about 10%. The uniformity of said adhesive layer may be experimentally determined. A possible way is to cut said multi-layer material through its thickness to obtain a cross sectional cut of said multi-layer material along its thickness. Said cross sectional cut can then be analysed by an optical microscopy. On the contrary, confocal laser microscopy allows to analyse the same cross sectional cut without previously cutting said multi-layer material through its thickness.

A layer of adhesive usually has some imperfections, like cracks, voids and undesirable porosity, where the bonding properties may be easily broken via mechanical or chemical stresses. We found that thin layers of adhesive are more subject to lose their bonding properties than thicker layers. Indeed, the substrates of adhesive in the thinner layer having imperfections may not be sufficiently counterbalanced by the surrounding substrates without imperfections. On the contrary, thicker layers have better chances to counterbalance said imperfections in their greater substrates, i.e. thinner layers of adhesive are more susceptible to lose their bonding properties than thicker layers. Therefore, as another preferred execution to further improve the resistance of said multi-layer material to said hypochlorite bleach, said adhesive layer is uniformly distributed in said multi-layer material.

As another alternative means which prevents that said multi-layer material degrades with the aggressive action of the hypochlorite bleach or components of said bleach is a barrier layer. Said barrier layer is located between said inner layer and said adhesive layer. Preferably, said barrier layer is made of a polyolefin material whose density and thickness is sufficient to prevent the migration of bleach through said barrier layer towards said adhesive layer. Preferably, said barrier layer is made of polyethylene of medium density (=MDPE) or high density (=HDPE), or of ethylene/vinyl alcohol copolymer (=EVOH), or of mixtures thereof. Preferably, said barrier layer made has a density of above 0.9 g/cm$^3$, more preferably in the range between 0.926 g/cm$^3$ to 0.97 g/cm$^3$, most preferably between 0.926 g/cm$^3$ and 0.965 g/cm$^3$. Preferably, the thickness of said barrier layer is between 5 μm and 95 μm, more preferably between 30 μm and 60 μm. We have found that said multi-layer material comprising said barrier layer according to the present invention reduces the migration of the contained hypochlorite bleach or bleach component(s) towards said adhesive layer.

Preferably, said barrier layer is co-extruded with said inner layer, forming a co-extruded layer. Then said outer layer is attached onto said co-extruded layer by said adhesive layer. Indeed, the opposite side made of said inner layer is more adequate for heat sealing in respect to said barrier layer, since a lower sealing energy is necessary for said inner layer. To further improve the resistance of said multi-layer material to said hypochlorite bleach, said adhesive layer may be a adhesive layer resistant to said hypochlorite bleach as described above, and/or said adhesive is applied above said threshold surface density as described above, and/or said adhesive is uniformly distributed as described above.

As described before, said barrier layer is located between said inner layer and said adhesive layer of said multi-layer material to protect said adhesive layer. Specifically, said barrier layer protects said adhesive layer when said multi-layer material is formed into a container containing a product comprising a hypochlorite bleach. Indeed, we found that the hypochlorite bleach or component(s) of the bleach comprised in said product are able to migrate through said inner layer made of LDPE as described above. On the contrary, said barrier layer is able to substantially reduce the migration towards said adhesive layer. Otherwise, without said barrier layer said adhesive layer would be exposed to great amounts of aggressive hypochlorite bleach/hypochlorite bleach component(s) which are able to decompose said adhesive, and eventually destroy at least partially the bonding properties of said adhesive. Consequently, said outer layer would de-laminate from said co-extruded barrier-inner layer. The corresponding container may lose, for example, its leak tightness in a few days. Therefore, said barrier layer is able to substantially increase the resistance of said multi-layer material to said hypochlorite bleach.

As another preferred option according to the present invention, said barrier material may be sandwiched between said inner layer and an intermediate layer. Said intermediate layer is preferably made of low density polyolefin. Preferably, said intermediate layer is made of the same material as said inner layer. This intermediate layer further increases the thickness and the barrier properties of the inner layer and the barrier layer of said multi-layer material in a cost efficient manner. The thickness of said intermediate layer is between 5 $\mu$m and 50 $\mu$m, more preferably between 20 $\mu$m and 40 $\mu$m.

In another preferred option, the wall thickness of the inner layer made of LDPE is increased. In this manner, the permeability of the inner layer to hypochlorite bleach can be further reduced, such to achieve a permeability below the threshold limit for the degradation of the adhesive layer. Preferably, the thickness of said LDPE layer is above 100 $\mu$m, and more preferably between 150 $\mu$m and 200 $\mu$m.

Said multi-layer material of the present invention is flexible. This means that said multi-layer material can be sufficiently bent without causing any permanent cracking into said multi-layer material itself. Nevertheless, we found that the multi-layer material according to the present invention is more resistant to wrinkles and punctures than the multi-layer material of the prior art without said barrier layer. Furthermore, we found that the water permeability of said multi-layer material according to the present invention is reduced with respect to the multi-layer material of the prior art without said barrier layer. Therefore, said multi-layer material according to the present invention provides better containment properties for liquid products in respect to the multi-layer material of the prior art without said barrier layer.

When said multi-layer material according to the present invention is formed into a container, said container is able to contain a liquid product comprising hypochlorite bleach. Preferably, said hypochlorite bleach has an available chlorine concentration of up to 150 g/l, most preferably a hypochlorite bleach with an available chlorine concentration in the range between 25 g/l to 50 g/l.

Preferably, said liquid product may be a detergent composition. Said detergent composition may be used for the cleaning of laundry, dish or hard surfaces.

The multi-layer of the present invention may be formed into a container. Said container is formed through heat sealing. Preferably, the forming into a container made of said multi-layer material according to the present invention comprises the following steps:

A) co-extruding said barrier layer with said inner layer, or as an option, co-extruding said barrier layer between said inner layer and said intermediate layer;

B) laminating said co-extruded layer of A) with an outer layer by interposing an adhesive layer between said outer layer and said co-extruded layer of A) to form the multi-layer material according to the present invention;

C) after at least 10 days of aging of B), said multi-layer material according to the present invention is cut into a sheet of desired dimensions;

D) at least two said sheets of equal dimensions are opposed against each other in such a manner that said inner layers contact each other;

E) said sheets of D) are formed into a sachet or pouch by heat sealing said sheets together along their peripheral edges, apart along a filling portion of said peripheral edges, so to allow the filling of said sachet or pouch;

F) said open sachet or pouch is filled with a liquid product comprising hypochlorite bleach;

G) said sachet or pouch is closed completely by heat sealing along said filling portion.

What is claimed is:

1. A flexible multiple layer container comprising:

a flexible multilayer material having an inner layer and an outer layer, and a bleach-resistant adhesive joining said inner and outer layers, wherein said inner layer is made of a heat sealable polyolefin and said outer layer is made of a printable plastic wherein said adhesive comprises a mixture of polyurethane and polyester and an isocyanate co-reactant and is employed at a level of at least 2.5 g/m$^2$; and a hypochlorite bleach solution stored within the container, wherein said inner layer is disposed adjacent said hypochlorite bleach solution and wherein said adhesive resists the aggressive action of said hypochlorite bleach solution or components of said hypochlorite bleach solution.

2. A multiple layer container according to claim 1 wherein said printable plastic is selected from a group consisting of polyethylene terephthalate, polypropylene, polyamide, polystyrene, ethylene/vinyl alcohol copolymer, polycarbonate, polyvinyl chloride and cellophane.

3. A multiple layer container according to claim 1 wherein said inner layer is made of low density polyethylene.

4. A method of making a flexible multiple layer material for containers used for storing a hypochlorite bleach, comprising the steps of:

providing a first layer of material, wherein said first layer is the outer layer of said flexible multiple layer material and wherein said outer layer is made of a printable plastic;

providing a second layer of material, wherein said second layer is the inner layer of said flexible multiple layer material and wherein said inner layer is made of a heat sealable polyolefin; and joining said first layer of material to said second layer of material with a bleach resistant adhesive, wherein said adhesive comprises a mixture of polyurethane and polyester and an isocyanate co-reactant and is employed at a level of at least 2.5 g/m$^2$.

* * * * *